United States Patent [19]
Klein et al.

[11] Patent Number: 6,120,951
[45] Date of Patent: Sep. 19, 2000

[54] METHOD FOR INCREASING PRODUCTIVITY WITHOUT RESOLUTION LOSS ON IMAGESETTERS

[75] Inventors: Thomas Klein, Wolfenbüttel, Germany; Hans Dewitte, Brugge, Belgium

[73] Assignee: Barco Graphics, Zwijnaarde, Belgium

[21] Appl. No.: 09/123,432

[22] Filed: Jul. 28, 1998

[30] Foreign Application Priority Data

Jul. 29, 1997 [EP] European Pat. Off. ............. 97870113

[51] Int. Cl.⁷ ...................................................... G03F 9/00
[52] U.S. Cl. .............................................................. 430/30
[58] Field of Search ................................................ 430/30

[56] References Cited

U.S. PATENT DOCUMENTS 4,307,929  12/1981  Eveleth .
5,182,575  1/1993  Kato et al. .
5,392,061  2/1995  Vondran, Jr. .
5,402,409  3/1995  Kataoka et al. .
5,532,859  7/1996  Guerin .

FOREIGN PATENT DOCUMENTS

608474A2  8/1994  European Pat. Off. .

*Primary Examiner*—Christopher G. Young
*Attorney, Agent, or Firm*—Pillsbury Madison & Sutro LLP

[57] ABSTRACT

The present invention relates to a method and an apparatus for creating an output of an imagesetter with high-resolution quality at the speed of low resolution. In the method used, the addressability of the light beam spot or spots of the imagesetter in the slow scan direction is larger than the resolution in that direction.

10 Claims, 4 Drawing Sheets

○ = possible positions for center of the spot

METHOD FOR INCREASING PRODUCTIVITY WITHOUT RESOLUTION LOSS ON IMAGESETTERS

BACKGROUND OF THE INVENTION

1. Field of the Invention

The present invention relates to a method and an apparatus for creating an output of an imagesetter with high-resolution quality at the speed of low resolutions. The invention can be applied to imagesetters like direct-to-plate imagesetters, more specifically direct to flexo plate or direct to thermal offset plate imagesetters.

2. Description of the Prior Art

Imagesetters are apparatuses in which graphic sheets, such as films or plates, are exposed to light, e.g. by means of a laser spot, in order to create an image on these films or plates by moving one or more light beams over the surface of the film or plate.

Flexo platesetters are typically external drum engines because exposing a flexo plate in an internal drum is cumbersome (due to the thickness of the plate). They have typically a size of 40 by 60 inch, and flatbed technology on such big sizes is known to be limited in optical quality, certainly for such high laser power as is needed for imaging flexo plates. Moreover, a tendency is visible towards direct exposure of the flexo plate mounted on a sleeve, which will be processed in the round to use on the flexo press without dismounting the plate from the sleeve. As flexo printing plates are always mounted externally around the sleeve (to be able to print), it will be clear for the reader that the external drum technology is the most promising technology for flexo platesetters.

In the following, the circumference direction of the drum of the imagesetter is named the "fast scan direction", and the axial direction is named the "slow scan direction". The axial distance between two neighboring tracks is named the "advance". Under "addressability" is understood the number of positions a laser beam can occupy in one direction or the other. "Resolution" means the mean distance between two neighboring imaging positions.

As is known in the art, the light beam which creates an image on the plate in a single beam apparatus writes a first track in the fast scan direction, is then moved by the advance in the slow scan direction, writes a second track in the fast scan direction, etc . . . . The speed of the imagesetter, and thus the productivity, is directly proportional to the drum turning speed and to the advance.

Compared to a conventional film imagesetter, the productivity of a direct to flexo plate imagesetter is up to one order of magnitude lower when the same resolution is obtained because usually the needed laser power is much higher for a flexo plate imagesetter than for a film imagesetter. Therefore, in order to get a competitive product, the speed of a direct to flexo plate imagesetter has to be increased without loss of resolution.

The current invention is especially of high importance for plate imagesetters where laser power is the limiting factor. In practice, this is most often the case for computer to flexo applications (CDI® or engraving) and for thermal plate exposure. CDI® asks for a laser power of 2.5 J/cm$^2$, so decent speeds can only be reached with lasers of 10 W and (far) more. In this region, every Watt more is a high additional cost. As a result, an imagesetter is needed which uses laser power in the most economic way: just enough to expose the plate, but nothing more.

The speed of an external drum imagesetter is given by following formula:

$$\frac{\text{surface}}{\text{time}} = nbeams * \text{drum\_speed} * advance * \text{drum\_perimeter}$$

with nbeams the number of beams of the imagesetter,
drum_speed the rotation speed of the drum,
advance the axial distance between neighboring tracks,
drum_Perimeter the perimeter of the drum Example: An imagesetter with a single beam, rotating 2000 rounds per minute with an advance of 1/2000 inch will expose 1 inch per minute around the drum. Suppose a drum of 40 inch perimeter, then 40 inch$^2$/minute are exposed or 4.3 cm$^2$/sec.

Increasing the speed is done through increasing one of the factors:

Increase the number of beams of the imagesetter. A multiple beam imagesetter is then obtained. Creating a multiple beam imagesetter is the typical way to increase the speed of an external drum imagesetter. However, it leads to a big number of additional difficulties such as consistent positioning of the different beams, avoiding interference and more complicated optics.

Increase the drum speed. This is the typical increasing factor for internal drum machines. However, for external drum, increasing the speed is limited because the plate or film is to be held on the drum while rotating. Faster rotation asks for a higher force to avoid the plate to detach from the drum. At a certain speed, vacuum or other attachments are too weak to keep the plate safely on the drum. Typical limiting speeds are around 2000 rpm.

Increase the drum perimeter. This is also limited to practical limits (the imagesetter is getting big) and plate size limitations. Also increasing the drum perimeter leads to higher forces needed to keep the plate on the drum for the same rotational speed.

Increase the advance. This is the interesting point for the current invention. The classic way to increase the advance is to lower resolution. Lowering resolution has a far-going effect on the quality of the screen points. High quality flexo (which is the market of the direct flexo plate imagesetter) asks for a quality of 2000 ppi or equivalent. It is an object of this invention to produce a screening quality comparable to 2000 ppi with advances of 1/1000 inch or bigger.

In the prior art, the problem of increasing the productivity of a direct to flexo plate imagesetter has been solved in different ways.

A first solution is to work in low resolution by using big pixels. Using the same low resolution in the fast scan direction as in the slow scan direction gives an overall low resolution. In that case the direct to flexo plate imagesetter is competitive with the conventional imagesetters for as far as speed is concerned, but it is not for as far as quality is concerned.

A second solution uses of pixels which are smaller in the fast scan direction than in the slow scan direction. The use of such rectangular pixels enables an increase of the productivity of the imagesetter, as the advance is larger, but it makes it difficult to form dot shapes. Furthermore a total new screen database is needed, and a lot of work has to be done to let the screens support it.

Another solution is described in U.S. Pat. No. 5,392,061 disclosing a system of "resolution enhancement". It is not a speed enhancement, but it is a quality enhancement, only in the fast scan direction. A format controller determines if an image pixel resides at an edge of an image feature and, if so, selects a pixel modification to enhance a representation of the feature edge.

Generally, by using a larger spot of laser light, the advance can be made bigger, so that less time is needed to image a whole plate, which leads to greater productivity. The advance can be made as big as the spot size is. But the larger the spot size, the less print quality can be obtained, because with a large spot size very small structures cannot reproducibly be imaged.

For a photopolymer printing plate for example, the minimum structure that can be reproducible imaged has, with the technologies used at present, a dimension of about 30 μm. Therefore the final print quality cannot be further increased by shrinking down the diameter of the laser spot far below 30 μm.

On the other hand, the outer shape of the imaged structures and therefore the final print quality will be influenced by the accuracy that is used to position the center of the laser beam focus spot during the imaging process (especially for slanted objects, screening dots, small text, . . . ). More than by spot size limitations, the final quality is influenced by addressability. A same spot size of 25 micron will make far better quality with 2000 ppi addressability than with 1000 ppi addressability.

Most of the current direct to flexo imagesetters use a spot size bigger than the advance when imaging in high resolutions such as 2000 ppi. This slows down the imaging process and does not make use of the speed advantage.

SUMMARY OF THE INVENTION

It is an object of the present invention to provide a method and an apparatus for increasing the productivity of a direct to flexo plate imagesetter with one or more light beam spots, without significant loss of quality, i.e. to get high resolution quality with the advance proper to low addressability. The imagesetter writes an image on a graphic sheet in scan lines consisting of pixels.

Contrary to what exists, the current invention combines both advantages of high addressability and large spot size to both speed up the imaging process and to reach high imaging quality. Therefore, the present invention uses a method whereby the addressability of the light beam spot or spots of the imagesetter in the slow scan direction is larger than the resolution in that direction.

The method of the present invention comprises the following steps:

(a) receiving inputs organized as a number N of tracks with M sample points on each track, (b) converting the N×M image points into N2 non-straight tracks of M2 sample points each, whereby N2 is smaller than N and whereby M2 may be smaller than, equal to or larger than M, and (c) imaging the N2 non-straight tracks on the graphic sheet.

Step (b) of the method is preferably carried out by the following steps:

(b1) different scan lines are taken together to form a track, whereby neighboring pixels of scan lines forming a track form a set of pixels in the slow scan direction, (b2) for each track, and therein for each set of pixels in the slow scan direction, the position of the light beam spot is selected depending on the values of said set of pixels, and (b3) subsequent spots are imaged based on the path formed by the subsequent positions of the light beam spot.

Preferably N2 is a true divider of N, which means that N2 is different from N and from 1.

Preferably the light beam spot is positioned more to the left if more pixels are black to the left than to the right and vice versa.

The position of the light beam spot for each combination of values of pixels in a set of pixels may be selected on the basis of a look-up table. Such look-up table may contain only the pixels of a set of pixels, or alternatively it may contain also the values of at least one adjacent pixel to the left and/or to the right of the set of pixels.

The resolution in the fast scan direction can be adapted to the addressability in the slow scan direction.

Preferably each light beam is positioned at coordinates (v,h), whereby v is the position in the fast scan direction and h is the position in the slow scan direction. Two in time subsequent imaging positions in the same track have coordinates determined by P(t)=(v,h) and P(t+dt)=(v+dv, h+dh), whereby dv is a constant determined by the resolution in the fast direction and dh is not constant and is determined by the conversion.

If the imagesetter comprises means for creating more than one light beam, multiple tracks of the N2 non-straight tracks may be imaged at a time, whereby each track may be imaged independently of all others.

The invention is used in the first place to increase the productivity of direct to flexo plate imagesetters, but can be applied also to other kinds of imagesetters.

The invention also provides an apparatus for increasing the productivity of an imagesetter without significant loss of quality. The apparatus comprises means for mounting a graphic sheet, input means for accepting graphical image data organized in a rectangular grid of N rows and M columns, converting means for converting the graphical image data to N2 non-straight scanlines of M2 pixel positions, N2 being smaller than N, and M2 being smaller than, equal to or larger than M, at least one optical head(s) for emitting each a light beam suitable to write an image on a graphic sheet, preferably a laser head, primary beam deflection means for deflecting to the graphic sheet each light beam coming from the optical head(s), focusing means for focusing each light beam on the graphic sheet, secondary beam deflection means for deflecting each light beam in a suitable way for obtaining the productivity enhancement in the slow scan direction.

The means for mounting a graphic sheet may be a rotatable drum or a flatbed.

The primary and the secondary beam deflection means may be realized by means of an Accusto Optical Modulator (AOM). The secondary beam deflection means comprise at least one AOM. The means may comprise one AOM for each beam to be deflected, one AOM for all beams together, or one AOM for each set of a specific number of beams. The primary and the secondary beam deflection means may physically be the same component.

BRIEF DESCRIPTION OF THE DRAWINGS

With the above as background, reference should now be made to the following description of the best mode for carrying out the invention and the accompanying drawings, wherein.

DESCRIPTION OF THE PREFERRED EMBODIMENTS

Resolution enhancement is typically different in the fast and the slow scan direction.

Resolution Enhancement in the Fast Scan Direction

Good flexographic printing quality is at least equal to plain 2000 ppi quality, in the fast as well as in the slow scan direction. Lower resolutions make ugly dot shapes, which are difficult to reproduce.

Typically, an external drum imagesetter has some set of possible addressabilities around the drum. These numbers can be determined by implementation or can be fixed on typical numbers like 1000, 2000 or 4000 ppi. Choosing a higher addressability around the drum is at no imaging time cost as long as the drum rotational speed remains equal.

On standard drum sizes the fast scan direction of an imagesetter has typically either 360000 pixels around the drum, which is equivalent to around 8000 ppi, or 180000 pixels, which is equivalent to around 4000 ppi. Good image quality can only be reached with this native addressability or its dividers (otherwise scaling effects produce moiré patterns). As the imaging speed is not influenced by the addressability of the pixels in the fast scan direction (because said speed depends on the turning speed of the drum), the best results will be reached when the 360000 pixels are always used, i.e. when imaging is done at 8000 ppi.

In the normal case, the advance in the slow direction will be chosen equally to the resolution pitch in the fast direction. If for example 4000 ppi is chosen around the drum, the advance will normally be ¼₀₀₀ ppi.

Figure 1:
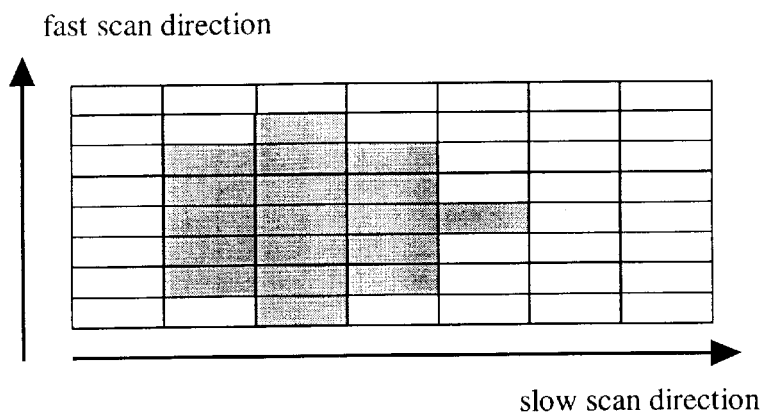
FIG. 1 represents resolution enhancement in the fast scan direction.

Resolution enhancement in the fast scan direction is obtained by ripping on a rectangular grid (see FIG. 1), using a RIP (=raster image processor) able to do so. This means that it must be possible to ask the rip a different resolution in the fast and the slow direction. Screening is done with rectangular pixels, which is difficult but feasible.

Resolution enhancement in the fast direction consists thus in choosing a resolution in the fast scan direction which is higher than what can be expected from the advance. Typically, a multiple of the slow scan resolution is chosen, for example 4000 ppi in the fast direction and 2000 or 1333.333 ppi in the slow direction.

With respect to the 2000 ppi quality currently in use in the market for both the fast and the slow scan direction, the couple (4000 ppi fast, 2000 ppi slow) produces a better quality, while the couple (4000 ppi fast, 1333.333 ppi slow) produces a quality comparable to 2000 ppi, but it is imaged faster. Resolution enhancement in the fast direction makes the trade-off between quality and speed less critical. Remark that there are more pixels in the resolution enhancement case (4000/3*4000 against 2000*2000, so 33% more pixels) but they are less ideally placed to make nice screens due to their rectangular shape.

Resolution Enhancement in the Slow Scan Direction

The resolution enhancement in the slow scan direction is an enlargement of the addressability without really making the resolution higher.

Figure 2:
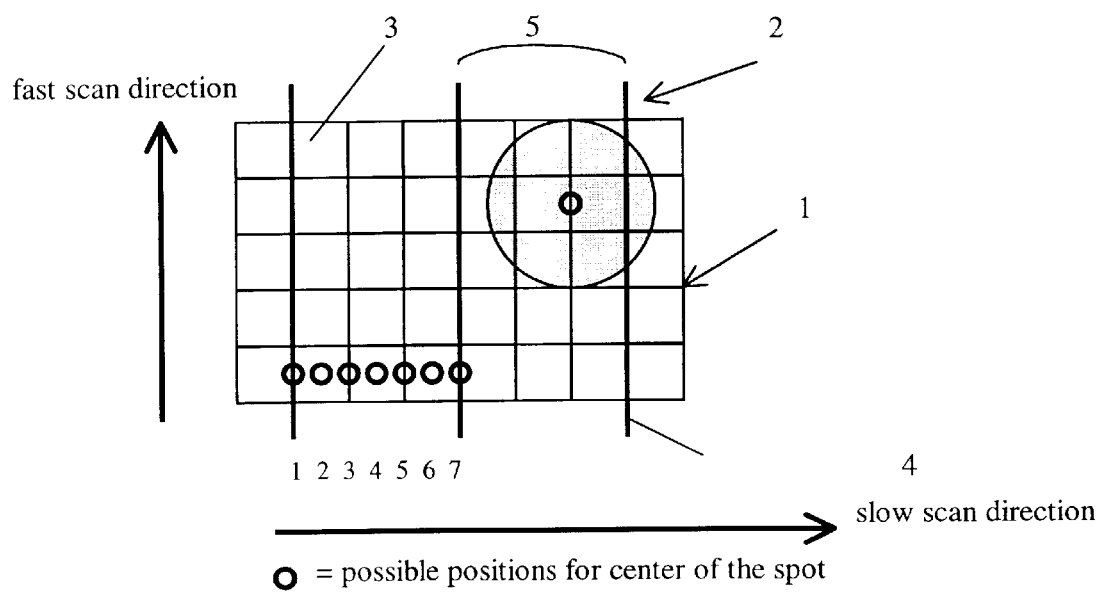
FIG. 2 represents resolution enhancement in the slow scan direction, by providing different positions in one track where the center of the laser spot can be positioned.

In FIG. 2 the addressability is 4000 ppi in principle in both the fast and the slow scan direction, which means that the center of the laser spot 2 can be placed in each of the 4000 ppi in both directions.

The resolution enhancement method in the slow scan direction consists in enlarging the addressability in the slow scan direction, so that the center of the laser spot 2 can be placed in more positions than the 4000 ppi. In the fast scan direction the addressability remains 4000 ppi.

The invention consists in finding a right position for centering the laser spot 2 over the possible positions in the slow scan direction. Therefore, different subsequent scan lines of the 4000 ppi bitmap are taken together in a track 5, as represented by the thick lines 4.

First Method

For example in FIG. 2, tracks 5 are formed by taking together three subsequent scan lines. For each track 5 of three scan lines in 4000 ppi, there are seven possible positions to place the center of the laser spot 2. Only one can be selected or none at all (no imaging).

For each track 5 of three scan lines, and therein, for each set of three pixels in the slow scan direction, the position of the center of the laser spot 2 is selected depending on the values of the pixels. It can be remarked that the one to eight combinations for the pixels are converted into one to eight positions for the laser spot 2, which are seven physical positions (as shown by the o on FIG. 2) and position 0 reserved for no imaging (white).

Subsequent spots are imaged based on the path formed by the subsequent positions of the laser spot 2. The resulting physical movement of the laser spot 2 is like a snake movement between the borders of the thick lines 4 (see FIG. 3). From that FIG. 3 it can be seen that the laser beam 6 (light grey color) nicely follows the shape of the underlying dot shape 7 (dark grey color).

Figure 3:
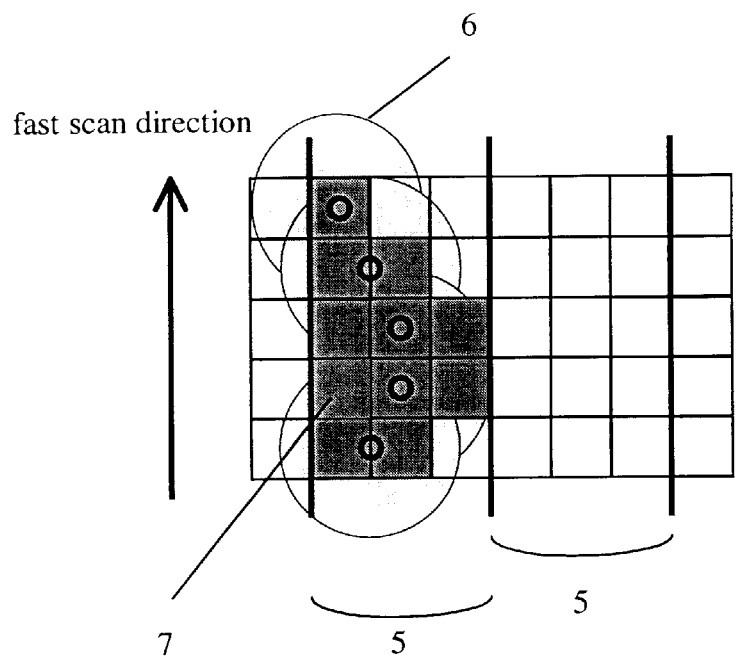
FIG. 3 shows a possible path a laser beam can go trough in the fast scan direction when providing resolution enhancement in the slow scan direction for a first scheme having 4000 ppi with a factor 3.

From FIG. 3 it is clear that the laser spot 2 will be positioned more to the left if more pixels are black to the left than to the right and vice versa. This is a general rule, however, not fundamental to the method. In fact, the method preferably uses a look-up table to determine the best suitable position for the laser spot 2.

If the method is based on three pixels as explained above, the look-up table contains altogether eight configurations:

| Pixels | Position | Remark |
| --- | --- | --- |
| 0 0 0 | None | White |
| 0 0 1 | 6 | Centered on right pixel |
| 0 1 0 | 4 | Centered on middle pixel |
| 0 1 1 | 5 | Between middle and right pixel |
| 1 0 0 | 2 | Centered on left pixel |
| 1 0 1 | 4 | Centered on middle pixel |
| 1 1 0 | 3 | Between middle and left pixel |
| 1 1 1 | 4 | Centered on middle pixel |

The cases 0 0 0 (no imaging) and 1 1 1 (position 4) are most probable.

Case 1 0 1 is doubtful, because you do not know where to put the laser spot 2. This configuration will not occur very frequently, because it is only one white pixel between for example two black parts of the image to be written on the plate. An easy way out is to just image the spot in the center position (position 4) and forget about the 0. Remark that this is what probably would happen also when a lower resolution would have been used to rip the image. We will see further that more intelligent solutions can be used in order to determine what to do in the 1 0 1 case.

In case 0 1 0 the laser spot 2 is centered on the middle pixel. It represents only one black pixel between for example two white parts of the image to be written on the plate. If we rip with 4000*4000 dpi and use 25 micron spot size, this one black pixel has a dimension smaller than the spot size, and the line will be broadened from original 8 micron to 25 micron. Remark that this would also happen if you would rip on a lower resolution. Depending on the properties of the RIP, the line would totally disappear (which is normally not wanted), or would be imaged at the full size of one pixel (a so called fat rip), in which case the line thickness would also increase to 25 micron.

Second Method

A second method is based on five pixels. This method allows dealing with this one black or white pixel in between two white or black parts of the image to be written on the plate, for some cases.

In this second method, for each track of three scan lines, and therein, for each set of three pixels in the slow scan direction, the position of the center of the laser spot 2 is selected depending on the values of the three pixels from the current track, and additionally two neighboring pixels, the right one of the adjacent scan line to the left and the left one of the adjacent scan line to the right. The rules for finding the right positions for centering the laser spot 2 are similar to the three-pixel-method, with the following addition: the center of the laser spot 2 is dragged further outside when the single black pixel of the three pixels of the current scan line has a black neighbor. This makes the look-up table for the five-pixel-method containing the following values:

| left | current | right | Position |
|---|---|---|---|
| 0 | 0 0 0 | 0 | 0 (none) |
| 0 | 0 0 0 | 1 | 0 (none) |
| 1 | 0 0 0 | 0 | 0 (none) |
| 1 | 0 0 0 | 1 | 0 (none) |
| 0 | 0 0 1 | 0 | 6 |
| 0 | 0 0 1 | 1 | 7 (influence of 1 in neighboring track) |
| 1 | 0 0 1 | 0 | 6 |
| 1 | 0 0 1 | 1 | 7 (influence of 1 in neighboring track) |
| 0 | 0 1 0 | 0 | 4 |
| 0 | 0 1 0 | 1 | 4 |
| 1 | 0 1 0 | 0 | 4 |
| 1 | 0 1 0 | 1 | 4 |
| 0 | 0 1 1 | 0 | 5 |
| 0 | 0 1 1 | 1 | 6 (influence of 1 in neighboring track) |
| 1 | 0 1 1 | 0 | 5 |
| 1 | 0 1 1 | 1 | 6 (influence of 1 in neighboring track) |
| 0 | 1 0 0 | 0 | 2 |
| 0 | 1 0 0 | 1 | 2 |
| 1 | 1 0 0 | 0 | 1 (influence of 1 in neighboring track) |
| 1 | 1 0 0 | 1 | 1 (influence of 1 in neighboring track) |
| 0 | 1 0 1 | 0 | 4 |
| 0 | 1 0 1 | 1 | 7 (influence of 1 in neighboring track) |
| 1 | 1 0 1 | 0 | 1 (influence of 1 in neighboring track) |
| 1 | 1 0 1 | 1 | 4 |
| 0 | 1 1 0 | 0 | 3 |
| 0 | 1 1 0 | 1 | 3 |
| 1 | 1 1 0 | 0 | 2 (influence of 1 in neighboring track) |
| 1 | 1 1 0 | 1 | 2 (influence of 1 in neighboring track) |
| 0 | 1 1 1 | 0 | 4 |
| 0 | 1 1 1 | 1 | 4 |
| 1 | 1 1 1 | 0 | 4 |
| 1 | 1 1 1 | 1 | 4 |

The five-pixel-method will deliver a more flexible choice for improving the quality.

The fast implementation is a look-up table from the 32 possibilities to a three bit output value (one of 8 positions).

For the cases 0 |0 0 1 |0; 1 |0 0 1 |0 ; x |0 1 0 |x; 0 |1 0 0 |x (x standing for 0 or 1) there will be exposed where the black dot is. Indeed, the image will expose darker, but there exist lots of solutions for this in the art (called dot gain compensation). As a matter of fact, this is a very old and well known effect, also on classic imagesetters.

In case 0 |1 0 1 |0 there are two black lines with one pixel width, spaced one pixel from each other. Anyway, if we rip at 4000*4000 dpi these lines have a dimension smaller than the usual spot size, and cannot be reproducibly imaged.

In case 1 |1 0 1 |1 there is a white line with one pixel line width between two black parts of the image, which again cannot be imaged reproducibly.

Both disadvantages are there also when we use lower resolutions.

In case 1 |0 1 1 |1 the 1 in the former track does not influence because there is a 0 in between.

As an example only, the used algorithm is demonstrated above for an imagesetter capable of putting a spot with 1333 dpi spot size on a 4000 ppi position in the fast scan direction and on one of 7 positions in the slow scan direction (see FIG. 2). In principle all other combinations of addressability and spot size might be used, whereas the speed enhancement effect, and thus the productivity enhancement, will only show up if the addressability is chosen higher than the spot size. The speed factor gained by the speed enhancement is equal to the ratio between the spot size and addressability. Therefore, in the above example, a system using the present invention would be 4000/1333=3 times faster than a conventional system without significant loss (or even without any visible loss) in imaging quality. Methods 1 and 2 produce a far better quality than 1333 ppi at the speed of 1333 ppi. The quality is comparable or even better than 2000 ppi. Both methods give a significant quality improvement.

Third Method

Figure 4:
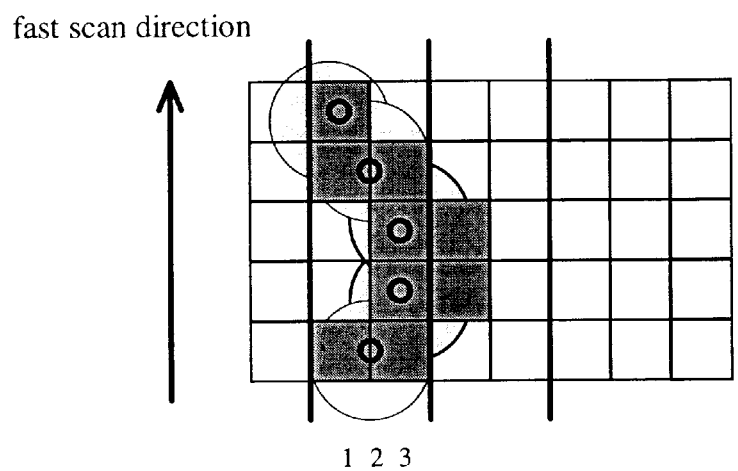
FIG. 4 shows a possible path a laser beam can go through in the fast scan direction when providing resolution enhancement in the slow scan direction for a second scheme having 2000 ppi with a factor 2.

Another example of the method according to the present invention is when we rip at 2000 ppi, with 1000 ppi advance (FIG. 4), and with the following very easy look-up-table.

| Pixels | Position | Remark |
|---|---|---|
| 0 0 | none | no image |
| 0 1 | 3 | image to the right |
| 1 0 | 1 | image to the left |
| 1 1 | 2 | image in the center |

Here again the possibility exists to use two pixels from the neighboring tracks. The possible positions for the laser spot are now 0 to 5, whereby 1 to 5 are physical positions: 1 corresponds to the left side of the track, 2 corresponds to centering on the left pixel, 3 corresponds to the position between the left and the right pixel, 4 corresponds to centering on the right pixel and 5 corresponds to the right side of the track; and whereby position 0 means no imaging. The look-up table is as follows:

| Left | Pixels | Right | Position |
|------|--------|-------|----------|
| 0 | 0 0 | 0 | 0 (none) |
| 0 | 0 0 | 1 | 0 (none) |
| 1 | 0 0 | 0 | 0 (none) |
| 1 | 0 0 | 1 | 0 (none) |
| 0 | 0 1 | 0 | 4 |
| 0 | 0 1 | 1 | 5 (influence of 1 in neighboring track) |
| 1 | 0 1 | 0 | 4 |
| 1 | 0 1 | 1 | 5 (influence of 1 in neighboring track) |
| 0 | 1 0 | 0 | 2 |
| 0 | 1 0 | 1 | 2 |
| 1 | 1 0 | 0 | 1 (influence of 1 in neighboring track) |
| 1 | 1 0 | 1 | 1 (influence of 1 in neighboring track) |
| 0 | 1 1 | 0 | 3 |
| 0 | 1 1 | 1 | 3 |
| 1 | 1 1 | 0 | 3 |
| 1 | 1 1 | 1 | 3 |

The advantage of the example explained hereinabove is that it is much faster than 2000 ppi (it has the speed of 1000 ppi), and that it has a better quality than 1000 ppi (quality coming near to 2000 ppi).

The look-up tables given hereinabove are only examples. Other look-up tables are possible as well.

Combination of Resolution Enhancements in Fast and Slow Scan Direction.

The resolution enhancements in the fast and the slow scan direction as explained hereinabove can be combined, so as to have a system with 4000 ppi imaging in the fast scan direction, the laser beam 6 making a snake-like movement over for example three scan lines in the slow scan direction. This combination leads to a speed enhancement of the imagesetter at the same quality, or to a quality enhancement at the same speed.

The attentive reader should have noticed that in methods 1 and 2, the fast scan direction was already set on 4000 ppi. Although this is not fundamental for the method, the method becomes really interesting when you do so, because only then, you can rip on 4000 ppi in both directions. Ripping in high resolution, with equal resolution in both directions is a main advantage towards screening quality.

The choice of the high and the low resolution is strongly connected to the choice of the RIP resolution. The RIP resolution determines the resolution of the bitmap generated by the screening unit. Mapping the screening bitmap on the exposer bitmap should be a rather straightforward operation. In most cases, it is just a straight one to one copy: each bitmap pixel is imaged as a microdot. In some cases, each bitmap pixel is used to image 2 or 4 microdots (sometimes the case for dispersed dot stochastic screening), but only easy schemes can be used because complicated schemes quickly lead to imaging quality loss and slowing down of the workflow.

In the case where we want to image on 4000 ppi in fast scan direction and a divider in the slow scan direction, the best case for the RIP resolution is simply 4000 ppi. In that case, we can take together the lines with the above scheme.

Having a square 4000 ppi resolution to generate screens is a major advantage towards the alternatives (straight 2000 ppi or resolution enhancement in the fast direction).

Current screening technologies are practically all made for square exposure grids. In the case of supercell screening, which is currently the most widespread solution, having a widely accepted quality, a database is to be made containing the supercells for all wanted ruling/angle couples. Depending on ruling, angles and screening technology, making this database is a partly manual, partly automatic process. Being able to reuse this database has following advantages:

No new database is to be made (which can take lots of work in testing). Even when the database is generated automatically for square grids, it is far from certain that the same will be possible for non-square grids such as in the case of resolution enhancement only in the fast direction.

The quality of the current database is accepted in the field. The behavior of the dots on the presses is known, and lots of customers measured compensation curves for these dots.

The ruling support is equal to the current ruling support for high resolutions, both on film imagesetters as on the current platesetters not using the technology of the current invention. Having the same ruling support is very important in the flexo market because often only one plate is to be remade (because the former contained errors, was broken or wore off, or small changes to the design have been made, e.g. a text change in the black plate only). The new plate has to fit with the others in order to avoid moiré. For this to happen, it has to have exactly the same ruling and angle properties.

When it comes to designing good screens, high resolution has following advantages over low resolutions:

More grey levels can be made.

Dot shapes can be designed with far more precision. Ideal dots behave better on the press than staircased dots.

Special dot shapes only produce a significantly better result than conventional dot shapes when they can be made on a high resolution grid.

Round off errors, leading into moiré patterns for low resolutions in the case of irrational screening or supercell screening, have a far less influence on high resolutions for a given screen ruling.

Given the high addressability, it is possible to calculate perfect screens "on the fly" by a special program, without attendance of a screening specialist like is mostly the case for the same ruling on low resolutions.

Apparatus Suitable to Support the Algorithm for Resolution Enhancement in the Slow Scan Direction.

Figure 5:
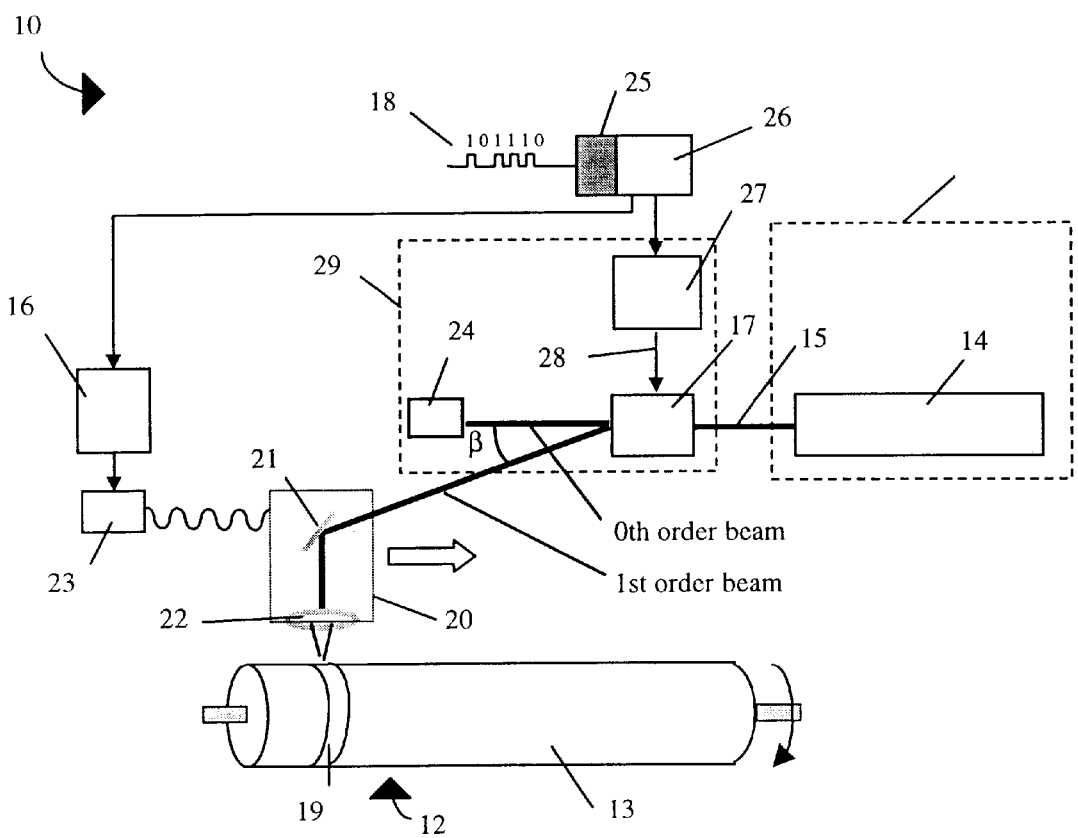
FIG. 5 shows an apparatus suitable to support the algorithm for resolution enhancement in the slow scan direction, provided with only one device as primary and secondary beam deflection means.
Figure 6:
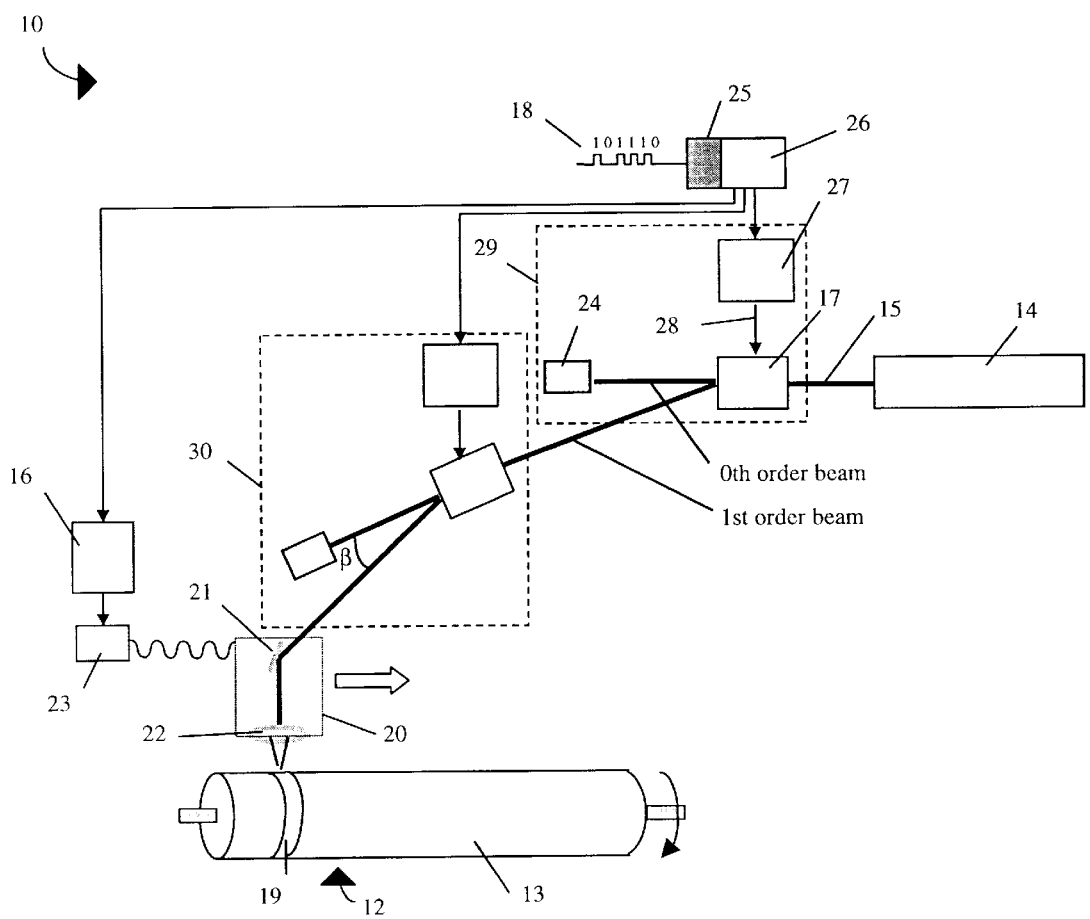
FIG. 6 shows an apparatus suitable to support the algorithm for resolution enhancement in the slow scan direction, provided with separated primary and a secondary beam deflection means.

Reference is now made to FIG. 5 and 6, which illustrate an apparatus 10 according to the present invention. The apparatus 10 comprises a rotatable drum 12 on which a graphic sheet 13 can be placed. The graphic sheet 13 may be a flexographic printing plate or any other suitable substrate.

The apparatus 10 comprises an optical head, for example a laser head 14, for emitting a laser beam 15 for creating an image on the surface of the graphic sheet 13 by moving said laser beam 15 over the surface of the graphic sheet 13 in a way explained hereinbelow.

The apparatus 10 also comprises hardware consisting of a suitable electronic circuit 16 for accepting fine-positioning information, and beam deflection means 17 for deflecting the light beam 15 in a suitable way for obtaining the resolution enhancement in the slow scan direction. This beam deflection means 17 can be realized by using an Accusto Optical Modulator (AOM).

One realization of such an apparatus 10 uses a laser beam 15 which is focused on the surface of the graphic sheet 13, whereas the graphic sheet 13 is mounted on the drum 12 rotating with constant speed. During each revolution of the drum 12, the image data 18 of one track 19 is transferred (fast scan direction). To cover the entire surface of the graphic sheet 13 on the drum 12, the focus position of the laser beam 15 is shifted by a proper distance (advance) in axial direction of the drum 12 (slow scan direction) after each revolution. Therefore, a focus carriage 20 containing a bending mirror 21 and a lens 22 is shifted in the slow scan direction by using a stepper motor 23.

To transfer the image data 18 to the graphic sheet 13, the laser beam 15 has to be modulated according to this information. Therefor, the image data 18, organized in a rectangular grid of N rows and M columns, is fed to input means 25. The thus accepted graphical image data 18 is then fed to converting means 26, which convert the graphical image data 18 to N2 (N2<N) non-straight scan lines of M2 (M2<M, M2=M or M2>M) pixel positions. The modulation can then be done using primary beam deflection means 29 comprising an Acoustic Optical Modulator (AOM) 17, which is driven by an RF signal 28 produced by an RF signal generator 27, according to the converted image data. A transducer at the surface of the AOM crystal converts the RF signal 28 into sound-waves propagating in the interior of the crystal. Finally, the laser beam 15 is Bragg-deflected at the sound wave fronts. The deflected laser beam (called 1st order beam) leaves the crystal under a deflection angle β with the not-deflected beam (called 0th order beam). Whereas the intensity of the 1st order beam depends on the amplitude of the RF signal, and thus of the information in the image data 18, the deflection angle β between the 0th order beam and the 1st order beam depends on the RF signal frequency. The 0th order beam is, as is known in the art, lead to a (water-cooled) beam-dump 24, usually a graphite block.

To realize the algorithm for realizing productivity enhancement for the apparatus 10, secondary beam deflection means 30 are used. At each pixel position the frequency of the corresponding RF signal, having constant amplitude, is adjusted accordingly to the image data to realize the fine positioning in the slow scan direction, which results in small modifications of the position of the focusing of the laser beam on the graphics sheet 13.

Both primary deflection means 29 and secondary deflection means 30 have the same basic setup.

Instead of using physically separate primary and secondary beam deflection means, as represented in FIG. 6, it is possible to use the same physical device to perform both functions, as represented in FIG. 5. In this case, at each pixel position the amplitude of the RF signal is modulated according to the image data 18. Furthermore, the corresponding fine positioning in slow scan direction is performed by properly adjusting the RF signal frequency, which results in small modifications of the position of the focusing of the laser beam on the graphic sheet 13.

The maximum amplitude of the snake movement depends on the method used. If neighboring tracks are taken into account, the maximum amplitude will be the full advance. In case the neighboring tracks are not taken into account, the maximum amplitude is smaller (½ of the advance in case each track consists of two subsequent scan lines; ⅔ of the advance in case each track consists of three subsequent scanlines).

In the apparatus 10 described hereinabove, the focus carriage 20 does not contain the laser head 14 itself. Although not described, it is possible to mount all components (laser head 14 included) on said focus carriage.

What is claimed is:

1. A method for increasing the productivity of an imagesetter without significant loss of quality, said imagesetter containing at least one light beam spot for writing an image on a graphic sheet, comprising:
    (a) receiving inputs organized as a number N of tracks with M sample points on each track,
    (b) converting the N×M image points into N2 non-straight tracks of M2 sample points each, N2 being smaller than N and M2 being smaller than, equal to or larger than M, and
    (c) imaging the N2 non-straight tracks on said graphic sheet.

2. A method according to claim 1, wherein the at least one light beam spot writes an image on a graphic sheet and wherein a right position for each light beam spot is found by:
    (b1) taking together different scan lines to form a track, whereby neighboring pixels of scan lines forming a track form a set of pixels in the slow scan direction,
    (b2) selecting for each track, and therein for each set of pixels in the slow scan direction, the position of the light beam spot depending on the values of said set of pixels, and
    (b3) imaging subsequent spots based on the path formed by the subsequent positions of the light beam spot.

3. Method according to claim 2, including positioning the light beam spot more to the left if more pixels are black to the left than to the right and vice versa.

4. A method according to claim 2, including selecting the position of the light beam spot on the basis of a look-up table giving a position of the light beam spot for each possible combination of values of the pixels in a set of pixels.

5. A method according to claim 3, including selecting the position of the light beam spot on the basis of a look-up table giving a position of the light beam spot for each possible combination of values of the pixels in a set of pixels.

6. A method according to claim 2, including selecting the position of the light beam spot on the basis of a look-up table giving a position of the light beam spot for each possible combination of values of the pixels in a set of pixels, and additionally the values of at least one of at least one adjacent pixel to the left and at least one pixel to the right of the set of pixels.

7. A method according to claim 1, whereby N2 is a true integer divider of N.

8. A method according to claim 1, including imaging multiple tracks of the N2 non-straight tracks at the same time using a multi-beam design, each track being imaged independently of the others.

9. A method according to claim 2, including imaging multiple tracks of the N2 non-straight tracks at the same time using a multi-beam design, each track being imaged independently of the others.

10. Method according to claim 1, wherein said imaging includes imaging the N2 non-straight tracks on said graphic sheet in such a way that two subsequent imaging positions in the track have coordinates determined by P(t)=(v,h) and P(t+dt)=(v+dv, h+dh), dv being a constant determined by the resolution in the fast scan direction and dh not being constant and determined by the conversion.

* * * * *